(12) United States Patent
Sullivan

(10) Patent No.: US 11,510,398 B2
(45) Date of Patent: Nov. 29, 2022

(54) BOWFISHING ARROW SLIDE WITH SHOCK ABSORBING SYSTEM

(71) Applicant: Kevin M. Sullivan, Lakemont, GA (US)

(72) Inventor: Kevin M. Sullivan, Lakemont, GA (US)

(*) Notice: Subject to any disclaimer, the term of this patent is extended or adjusted under 35 U.S.C. 154(b) by 602 days.

(21) Appl. No.: 16/519,966

(22) Filed: Jul. 23, 2019

(65) Prior Publication Data

US 2020/0022345 A1    Jan. 23, 2020

Related U.S. Application Data

(60) Provisional application No. 62/701,971, filed on Jul. 23, 2018.

(51) Int. Cl.
| | | |
|---|---|---|
| *A01K 81/04* | (2006.01) | |
| *F42B 6/02* | (2006.01) | |
| *F41B 5/14* | (2006.01) | |
| *F16F 1/04* | (2006.01) | |

(52) U.S. Cl.
CPC ............. *A01K 81/04* (2013.01); *F16F 1/04* (2013.01); *F41B 5/1488* (2013.01); *F42B 6/02* (2013.01); *F16F 2234/02* (2013.01)

(58) Field of Classification Search
CPC . F42B 6/02; F42B 6/04; F41B 5/1488; A01K 81/00; A01K 81/04; F16F 1/04; F16F 1/06; F16F 2234/02
USPC ........................................ 43/6; 473/576, 578
See application file for complete search history.

(56) References Cited

U.S. PATENT DOCUMENTS

| | | | | |
|---|---|---|---|---|
| 3,945,642 A | * | 3/1976 | Henthorn, Jr. ............ | F42B 6/08 473/585 |
| 4,895,128 A | * | 1/1990 | Okada .................... | A01K 81/00 124/31 |
| 4,905,397 A | * | 3/1990 | Juelg, Jr. .................. | F42B 6/04 473/578 |
| 5,335,439 A | * | 8/1994 | Horton ................... | A01K 81/04 43/18.1 R |
| 5,496,041 A | * | 3/1996 | Broussard ............. | F42B 12/385 473/578 |
| 5,553,413 A | * | 9/1996 | Gannon ................. | A01K 81/04 473/576 |
| 5,846,147 A | * | 12/1998 | Basik ...................... | F42B 10/12 473/585 |
| 6,517,453 B2 | * | 2/2003 | LaSee ...................... | F42B 6/04 473/578 |

(Continued)

*Primary Examiner* — Alexander R Niconovich
(74) *Attorney, Agent, or Firm* — Greenberg Traurig LLP

(57) ABSTRACT

A bowfishing arrow slide configured to slidably attach a bowfishing line to an arrow and configured to include a shock absorbing system to enhance the life of the slide is disclosed. The bowfishing arrow slide enables a bowfishing line to be slidably attached to the arrow to keep the arrow attached to a line reel even after being shot and to allow the slide to move from a preshot position at the tip of the arrow to the rear of the arrow during the shot for improved arrow flight. The bowfishing arrow slide may include a shock absorbing system on the bowfishing arrow slide whereby the shock absorbing system is configured to absorb impact forces created when the strikes a slide stop on an arrow shaft when the arrow is shot. The shock absorbing system reduces damage to the slide thereby enhancing the useful life of the slide.

20 Claims, 5 Drawing Sheets

(56) References Cited

U.S. PATENT DOCUMENTS

| | | | | |
|---|---|---|---|---|
| 7,331,886 B2* | 2/2008 | Morris | ............... | F42B 10/18 |
| | | | | 473/578 |
| 9,109,852 B1* | 8/2015 | Boester | ............... | F41B 5/148 |
| 9,134,101 B2* | 9/2015 | Griffith | ............... | F42B 6/04 |
| 9,163,898 B2* | 10/2015 | Pedersen | ............... | F41B 5/1484 |
| 9,228,812 B1* | 1/2016 | White | ............... | F42B 6/04 |
| 9,970,729 B1* | 5/2018 | Coalson | ............... | F41B 5/1484 |
| 10,030,954 B2* | 7/2018 | Brown | ............... | F42B 12/362 |
| 10,794,659 B2* | 10/2020 | Walthert | ............... | F42B 6/04 |
| 2010/0229845 A1* | 9/2010 | Woods, Jr. | ............... | F41B 5/14 |
| | | | | 124/88 |
| 2019/0101354 A1* | 4/2019 | Kozlik | ............... | F41B 5/148 |
| 2019/0335730 A1* | 11/2019 | McPherson | ............... | F42B 6/08 |
| 2020/0022345 A1* | 1/2020 | Sullivan | ............... | F16F 1/06 |

\* cited by examiner

BOWFISHING ARROW SLIDE WITH SHOCK ABSORBING SYSTEM

CROSS-REFERENCE TO RELATED APPLICATION

This application claims the benefit of U.S. Provisional Patent Application No. 62/701,971, filed on Jul. 23, 2018, which are both incorporated herein in their entireties.

FIELD OF THE INVENTION

This invention is directed generally to fish harvesting systems, and more particularly to equipment usable for bowfishing arrows and spearfishing shafts.

BACKGROUND

Bowfishing equipment has been used throughout the years to successfully harvest fish of all varieties. Typically, an arrow used for bowfishing includes an arrowhead with a barb for keeping the fish attached to the arrow once shot and includes a retrieval line attached to a slide that slides between the arrowhead and a stop that is typically near the nock at the other end of the arrow. This configuration enables the retrieval line to be positioned between the arrow head and the bow when the bow is drawn, thereby preventing the retrieval line from catching on the bow or arrow rest. The safety slide slides to the nock end of the arrow once shot and during arrow flight to provide better flight characteristics for the arrow. The arrow moves very quickly relative to the slide, which causes the slide to strike the stop with significant force. The impact often weakens and damages the slide.

SUMMARY OF THE INVENTION

A bowfishing arrow slide configured to slidably attach a bowfishing line to an arrow and configured to include a shock absorbing system to enhance the life of the slide is disclosed. The bowfishing arrow slide enables a bowfishing line to be slidably attached to the arrow to keep the arrow attached to a line reel even after being shot and to allow the slide to move from a preshot position at the tip of the arrow to the rear of the arrow during the shot for improved arrow flight. The bowfishing arrow slide may include a shock absorbing system on the bowfishing arrow slide whereby the shock absorbing system is configured to absorb impact forces created when the bowfishing arrow slide strikes a slide stop on an arrow shaft when the arrow is shot. The shock absorbing system reduces damage to the slide thereby enhancing the useful life of the slide.

An advantage of the bowfishing arrow slide is that the shock absorbing system is configured to absorb impact forces created when the bowfishing arrow slide strikes a slide stop on an arrow shaft when the arrow is shot.

Another advantage of the bowfishing arrow slide is that shock absorbing system reduces damage to the slide thereby enhancing the useful life of the slide shock absorbing system to enhance the life of the slide is disclosed.

These and other embodiments are described in more detail below.

BRIEF DESCRIPTION OF THE DRAWINGS

The accompanying drawings, which are incorporated in and form a part of the specification, illustrate embodiments of the presently disclosed invention and, together with the description, disclose the principles of the invention.

DETAILED DESCRIPTION OF THE INVENTION

Figure 1:
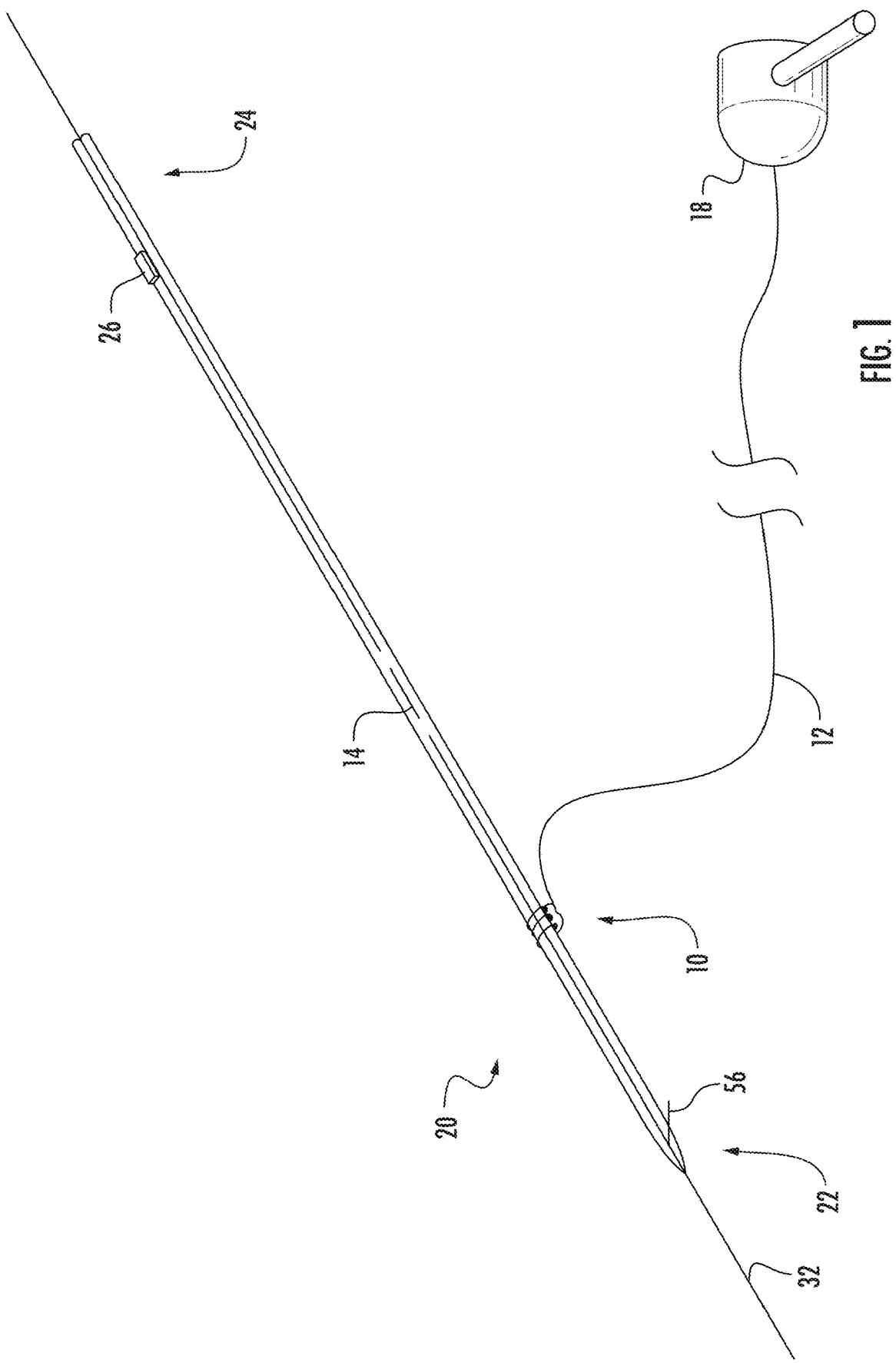
FIG. 1 is a perspective view of a bowfishing arrow slide attached to an arrow.

As shown in FIGS. 1-9, a bowfishing arrow slide 10 configured to slidably attach a retrieval line 12 to an arrow 14 and configured to include a shock absorbing system 16 to enhance the life of the slide 10 is disclosed. The bowfishing arrow slide 10 enables a bowfishing line 12 to be slidably attached to the arrow 14 to keep the arrow 14 attached to a line reel 18 even after being shot and to allow the slide 10 to move from a preshot position 20 at a tip 22 of the arrow 14 to the rear 24 of the arrow 12 during the shot for improved arrow flight. The bowfishing arrow slide 10 may include a shock absorbing system 16 on the bowfishing arrow slide 10 whereby the shock absorbing system 16 is configured to absorb impact forces created when the bowfishing arrow slide 10 strikes a slide stop 26 on an arrow shaft 14 when the arrow 14 is shot. The shock absorbing system 16 reduces damage to the slide 10 thereby enhancing the useful life of the slide 10.

In at least one embodiment, the bowfishing arrow slide 10 may be formed from a body 28 forming one or more shaft retention sections 30 configured to slidably retain an arrow shaft 14 therein such that the bowfishing arrow slide 10 may slide along the arrow shaft 14 generally along a longitudinal axis 32 of the arrow shaft 14. In at least one embodiment, the body 28 forming the shaft retention section 30 may be formed from, but is not limited to, an elongated wire. The materials used to form the elongate wire may include, but are not limited to being, a metal wire (stainless steel etc.), metal injection molding and molded plastic. The body 28 forming the shaft retention section 30 may cover more than one half of a circumference of an arrow shaft 14. Such configuration keeps the slide 10 attached to the arrow 14. In at least one embodiment, the body 28 forming the shaft retention section 30 may be formed from a partial circle covering more than one half of a circumference of an arrow shaft 14. In addition, the body 28 forming the shaft retention section 30 may be formed from a partial circle covering more than ¾ of a circumference of an arrow shaft 14. In at least one embodiment, the body 28 forming the shaft retention section 30 may be formed from a full circle surrounding the arrow shaft 14.

The bowfishing arrow slide 10 may include a shock absorbing system 16 on the bowfishing arrow slide 10. The shock absorbing system 10 may be configured to absorb impact forces created when the bowfishing arrow slide 10 strikes a slide stop 26 on an arrow shaft 14 when the arrow 14 is shot. The shock absorbing system 10 on the bowfishing arrow slide 10 may be formed from first and second arms 34, 36 separated laterally in a direction along a longitudinal axis 32 of an arrow 14 when the body 28 of the bowfishing arrow slide 10 is slidably attached to the arrow 14. In at least one embodiment, the first and second arms 34, 36 may be positioned generally parallel. In other embodiments, the first and second arms 34, 36 may be positioned differently. The first and second arms 34, 36 may be separated by a spring action component 38. The spring action component 38 may be coupled to the first and second arms 34, 36. The spring action component 38 may be at least partially positioned between the first and second arms 34, 36. The spring action component 38 may form a channel through which an arrow shaft 14 can slidably move. In at least one embodiment, the spring action component 38 may form a channel from material wound in a helical form. The material wound in a helical form forming a channel may be formed form, but is not limited to, metal wire. The materials used to form the wire may include, but are not limited to being, a metal wire (stainless steel etc.), metal injection molding and molded plastic.

Figure 2:
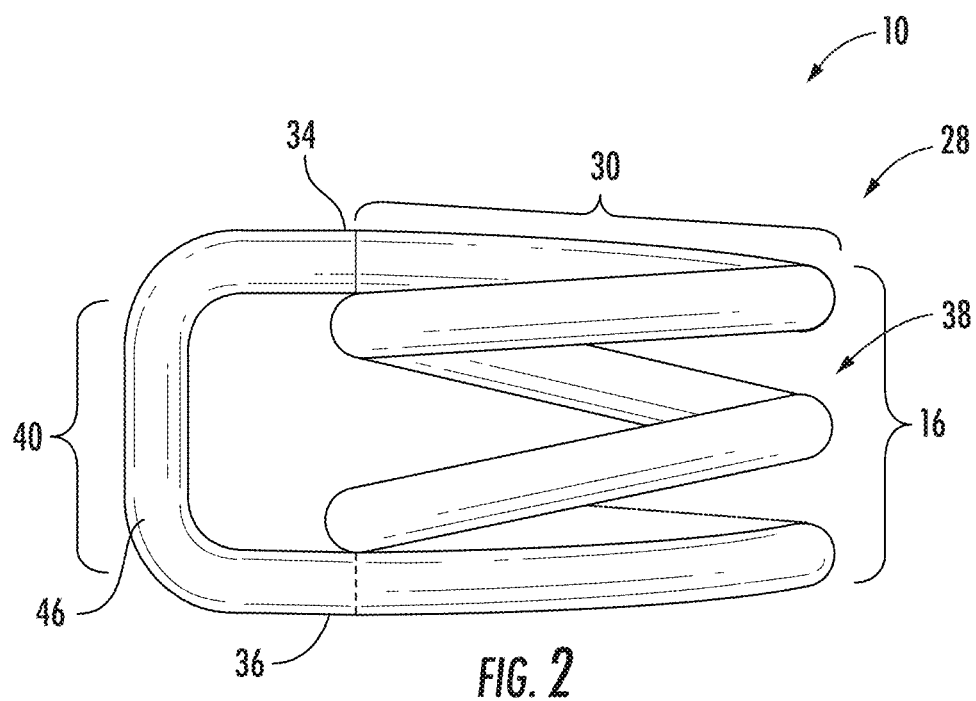
FIG. 2 is a side view of an embodiment of the bowfishing arrow slide.
Figure 3:
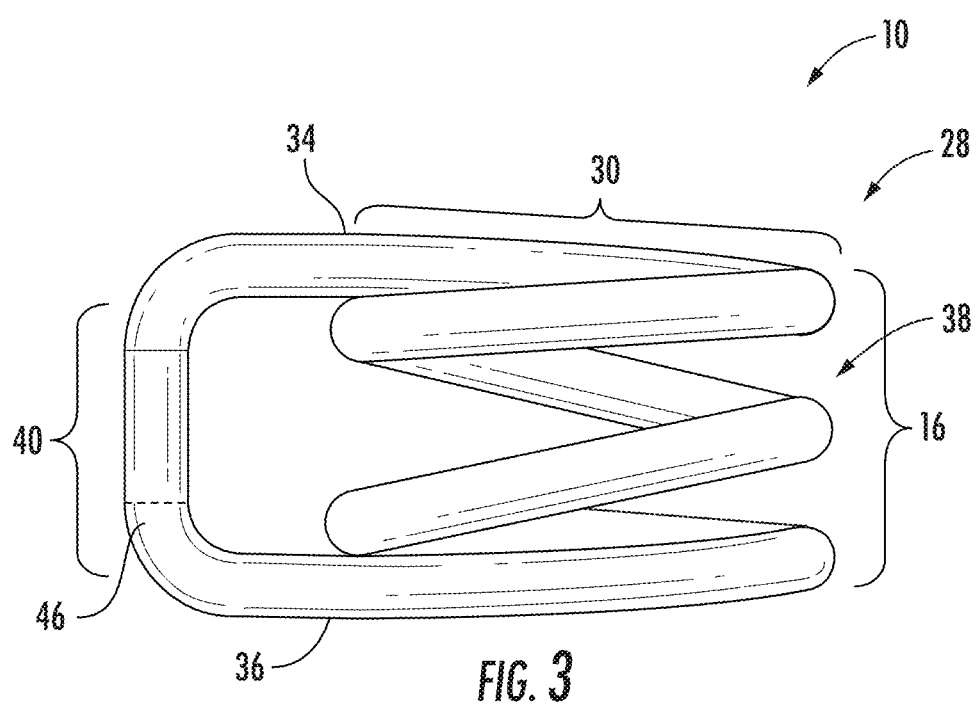
FIG. 3 is a side view of another embodiment of the bowfishing arrow slide with a different assembly point.
Figure 4:
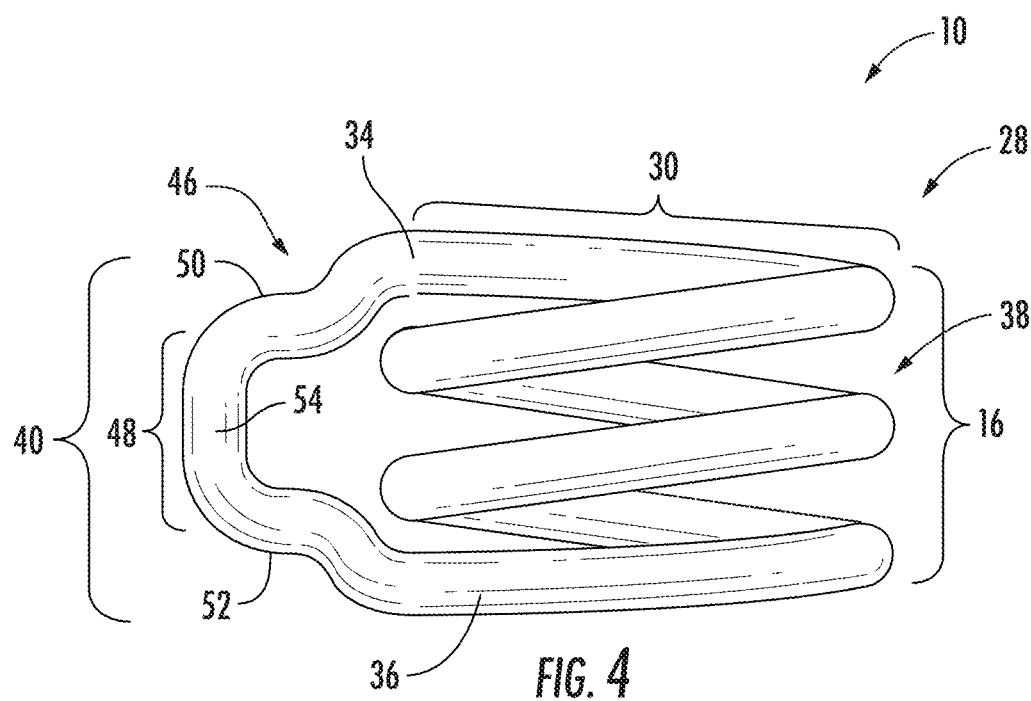
FIG. 4 is a side view of another embodiment of the bowfishing arrow slide with an alternative configuration of a bowfishing line attachment section.
Figure 5:
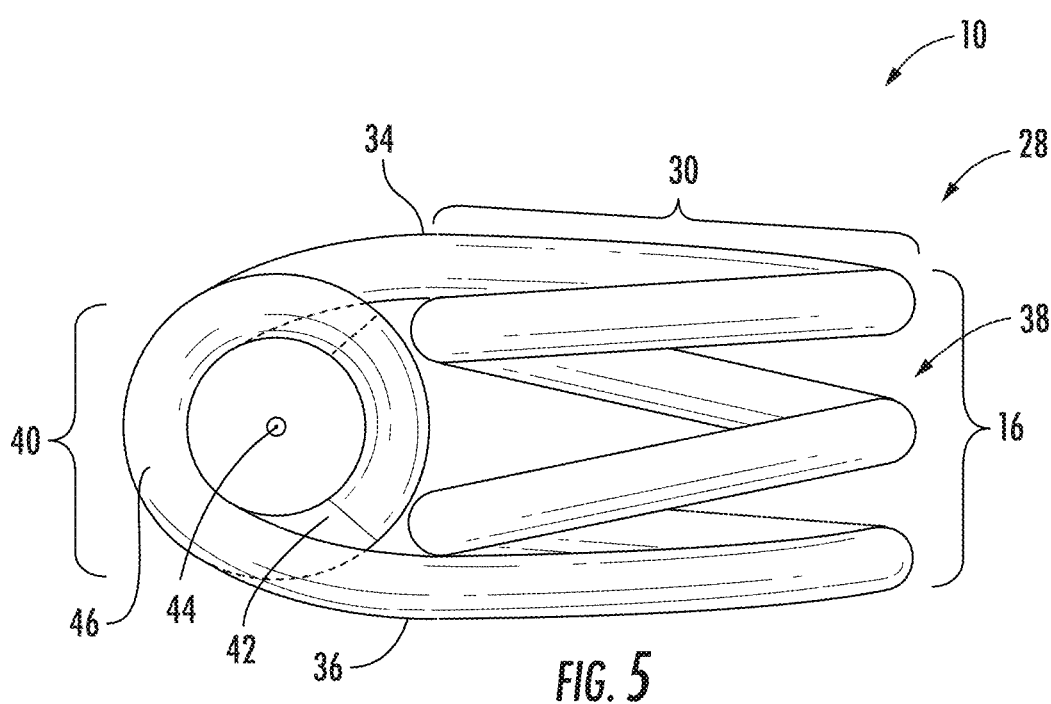
FIG. 5 is a side view of another embodiment of the bowfishing arrow slide with a bowfishing line attachment section configured as a helical loop.

The bowfishing arrow slide 10 may also include one or more bowfishing line attachment sections 40 configured such that a bowfishing line 12 is attachable to the bowfishing arrow slide 10. The bowfishing line attachment section 40 may be positioned between the first and second arms 34, 36 of the spring action component 38. In at least one embodiment, the bowfishing line attachment section 40 may be formed from one or more helical loops 42, as shown in FIG. 5, between the first and second arms 34, 36. A longitudinal axis 44 of the helical loop 42 forming the bowfishing line attachment section 40 may be generally orthogonal to the longitudinal axis 32 of an arrow 14 when the body 28 of the bowfishing arrow slide 10 is slidably attached to the arrow 14 and offset from the longitudinal axis 32 of the arrow 14. In at least one embodiment, as shown in FIGS. 2, 3 and 5, the bowfishing line attachment section 40 may be formed from a lateral member 46 extending from the first arm 34 to the second arm 36. In at least one embodiment, as shown in FIG. 4, the bowfishing line attachment section 40 may be formed from a lateral member 46 extending from the first arm 34 to the second arm 36, wherein the lateral member 46 includes an offset protrusion section 48. The offset protrusion section 48 on the lateral member 46 may be formed from first and second offset arms 50, 52 extending from the lateral member 46. The offset protrusion section 48 may also be formed from an offset arm 54 extending between the first and second offset arms 50, 52, wherein the offset arm 54 is offset from the lateral member 46.

Figure 9:
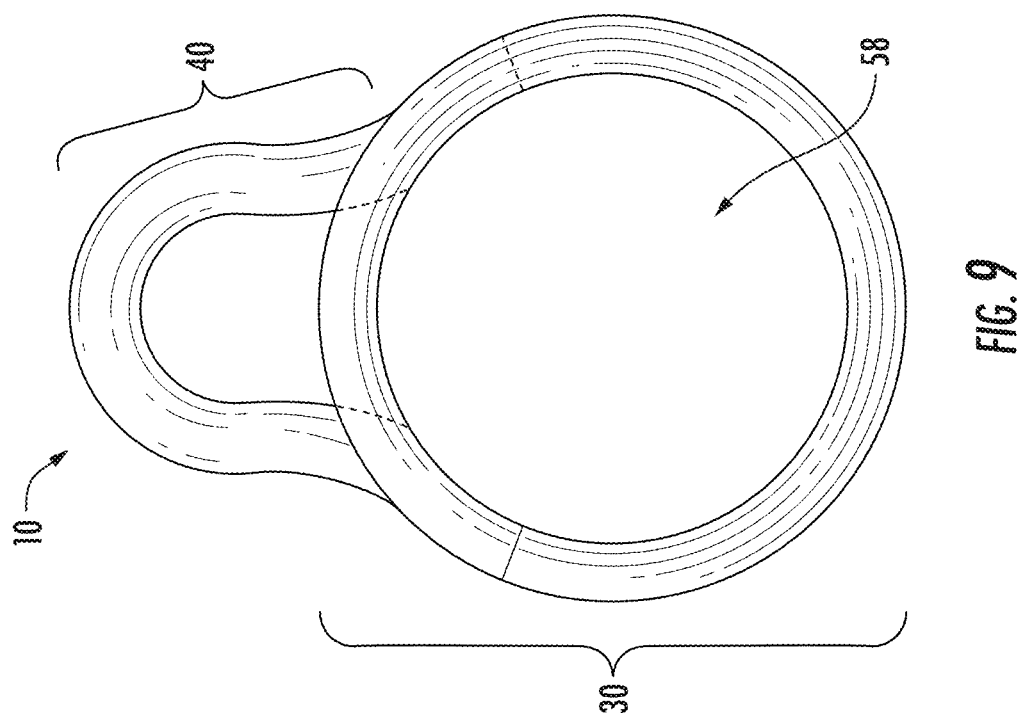
FIG. 9 is an end view of the bowfishing arrow slide of FIG. 8.
Figure 8:
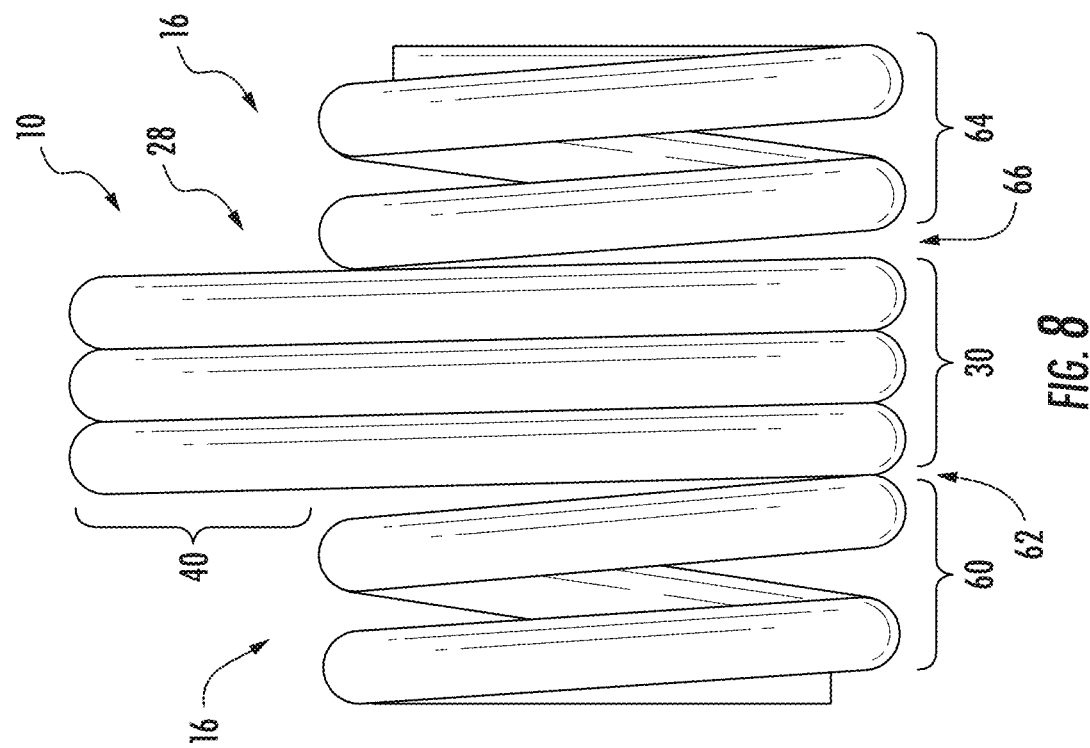
FIG. 8 is a side view of another embodiment of the bowfishing arrow slide formed from a body with a bowfishing line attachment section on one side and a first shock absorbing system on a first end and a second shock absorbing system on a second end.

As shown in FIGS. 8 and 9, the bowfishing arrow slide 10 may be formed from a body 28 with shaft retention sections 30 configured to slidably retain an arrow shaft 14. The body 28 may form a bowfishing line attachment sections 40 on a side of the body 28. In at least one embodiment, a helical shaped, elongated wire may form the body 28 may form a bowfishing line attachment section 40 on a side of the body 28. Adjacent portions of the helical shaped, elongated wire may be touching each other, thereby eliminating any spring effect in the body 28. Each end of the body 28 may include a shock absorbing system 16. In particular, the body 28 may include a first shock absorbing system 60 on a first end 62 and a second shock absorbing system 64 on a second end 66 of the body 28. In at least one embodiment, the first and second shock absorbing systems 60, 64 may be formed from helical wound elongated wire.

Figure 7:
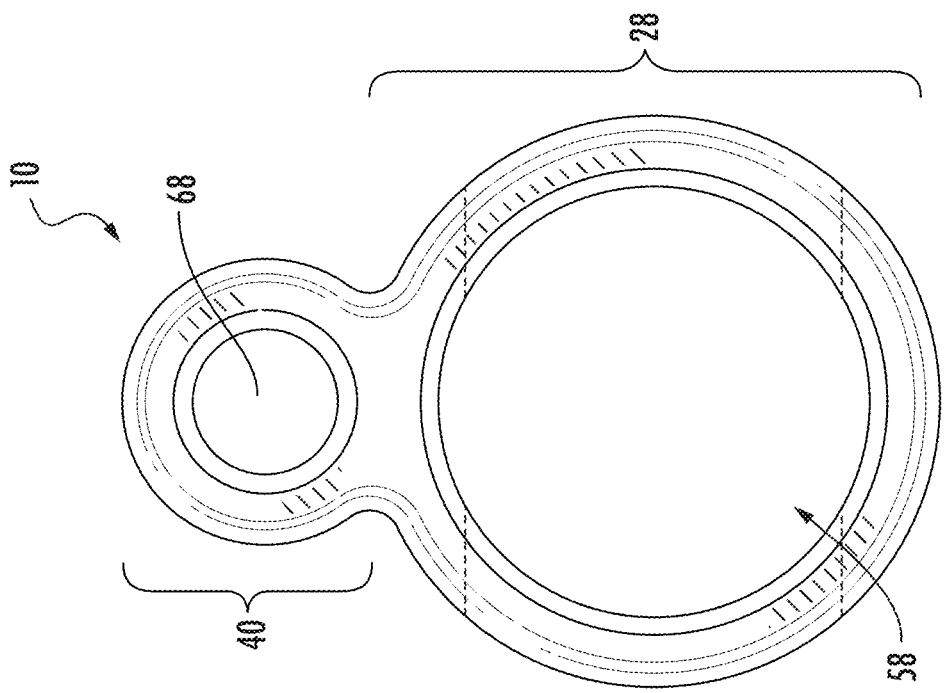
FIG. 7 is an end view of the bowfishing arrow slide of FIG. 6.
Figure 6:
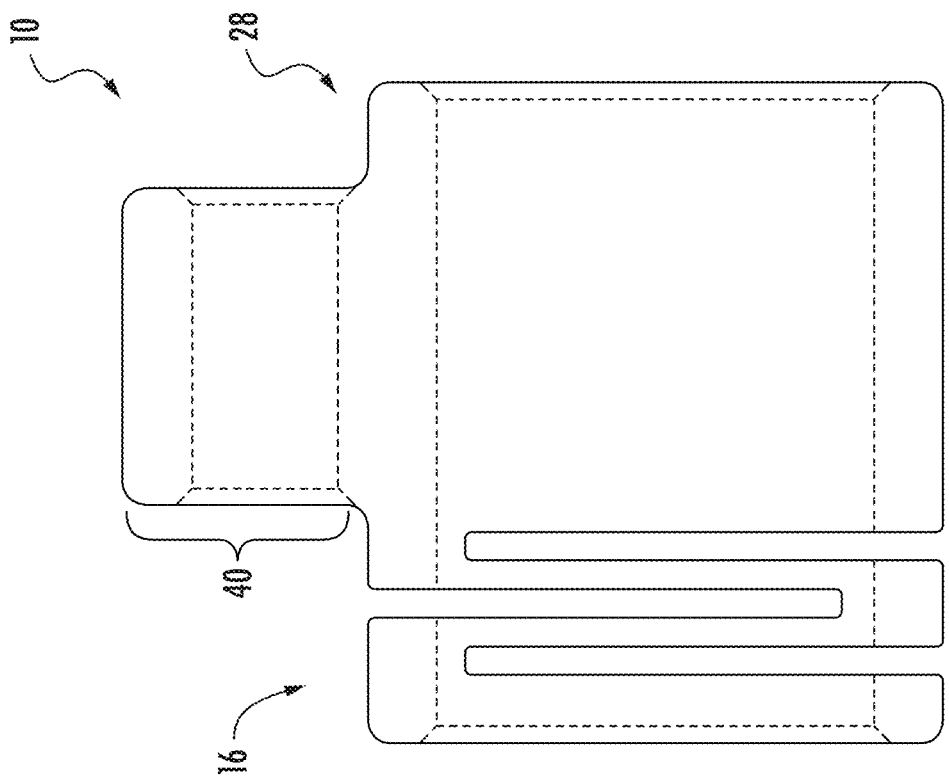
FIG. 6 is a side view of another embodiment of the bowfishing arrow slide formed from a body with a bowfishing line attachment section on one side and a shock absorbing system on one end.

In another embodiment, as shown in FIGS. 6 and 7, the bowfishing arrow slide 10 may be formed from a body 28 with a shock absorbing system 16 coupled to one end of the body 28 in alignment with the arrow receiving opening 58 in the body 28. In at least one embodiment, the body 28, shock absorbing system 16 and the bowfishing line attachment section 40 may be integrally formed. The bowfishing arrow slide 10 of FIGS. 6 and 7 may be formed from materials such as, but not limited to, metal injection molding and molded plastic. The bowfishing line attachment section 40 may include one orifice 68 for receiving a bowfishing line. The shock absorbing system 16 of the embodiment shown in FIGS. 6 and 7 are formed from alternating partial slots.

The bowfishing arrow slide 10 may be attached to an arrow 14 by sliding the slide 10 onto the arrow 14. The slide 10 may freely slide between the tip 22 of the arrow 14 and the rear 24 of the arrow 10. A barb 56 on the tip 22 and the stop 26 prevent the slide 10 from falling off the arrow 14. Bowfishing line 12 may be tied to the slide 10 at the bowfishing line attachment section 40. In alternative configurations, the bowfishing line 12 may extend from the line reel 18, thru the bowfishing line attachment section 40 and may be tied to a removable arrow tip. Before an arrow 14 is shot, the bowfishing arrow slide 10 is positioned near the tip 22 of the arrow 14 so that when the arrow tip 22 is drawn closer to an arrow rest when a bow, crossbow, or the like is drawn, the slide 10 and the bowfishing line 12 do not become entangled in the arrow rest. Once the arrow is shot, the slide 10 moves rearwardly on the arrow 10 due to drag forces acting upon the slide 10. It is desirable for the slide 10 to be positioned rearwardly on the arrow 10 to improve flight of the arrow 14. The arrow 14 moves forward immediately upon the arrow 14 being shot. The arrow 14 moves very fast and causes the slide 10 to strike the slide stop 26 on the arrow 14. The shock absorbing system 10 on the bowfishing arrow slide 10 absorbs forces created by the slide hitting the slide stop 26 on the arrow 14 when the arrow 14 is in flight immediately after being released from a bow, crossbow and the like.

The foregoing is provided for purposes of illustrating, explaining, and describing embodiments of this invention. Modifications and adaptations to these embodiments will be apparent to those skilled in the art and may be made without departing from the scope or spirit of this invention.

I claim:
1. A bowfishing arrow slide, comprising:
a body forming at least one shaft retention section configured to slidably retain an arrow shaft therein such that the bowfishing arrow slide may slide along the arrow shaft generally along a longitudinal axis of the arrow shaft;
at least one bowfishing line attachment section configured such that a bowfishing line is attachable to the bowfishing arrow slide;
a shock absorbing system on the bowfishing arrow slide, wherein the shock absorbing system is configured to absorb impact forces created when the bowfishing arrow slide strikes a slide stop on an arrow shaft when the arrow is shot; and wherein the body forming at least one shaft retention section and the shock absorbing system are formed from at least one elongated wire.

2. The bowfishing arrow slide of claim 1, wherein the body forming at least one shaft retention section covers more than one half of a circumference of an arrow shaft.

3. The bowfishing arrow slide of claim 2, wherein the body forming at least one shaft retention section is formed from a full circle surrounding an arrow shaft.

4. The bowfishing arrow slide of claim 2, wherein the shock absorbing system on the bowfishing arrow slide is formed from first and second arms separated laterally in a direction along a longitudinal axis of an arrow when the body of the bowfishing arrow slide is slidably attached to the arrow.

5. The bowfishing arrow slide of claim 4, wherein the first and second arms are separated by a spring action component.

6. The bowfishing arrow slide of claim 5, wherein the spring action component is coupled to the first and second arms and at least partially positioned between the first and second arms.

7. The bowfishing arrow slide of claim 6, wherein the spring action component forms a channel through which an arrow shaft can slidably move.

8. The bowfishing arrow slide of claim 7, wherein the spring action component forms a channel from material wound in a helical form.

9. The bowfishing arrow slide of claim 8, wherein material wound in a helical form forming a channel is formed from metal wire.

10. The bowfishing arrow slide of claim 6, wherein the at least one bowfishing line attachment section is positioned between the first and second arms of the spring action component.

11. The bowfishing arrow slide of claim 10, wherein the at least one bowfishing line attachment section forms at least one helical loop between the first and second arms.

12. The bowfishing arrow slide of claim 11, wherein a longitudinal axis of the at least one helical loop forming the bowfishing line attachment section is generally orthogonal to the longitudinal axis of an arrow when the body of the bowfishing arrow slide is slidably attached to the arrow and is offset from the longitudinal axis of the arrow.

13. The bowfishing arrow slide of claim 10, wherein the at least one bowfishing line attachment section is formed from a lateral member extending from the first arm to the second arm.

14. The bowfishing arrow slide of claim 10, wherein the at least one bowfishing line attachment section is formed from a lateral member extending from the first arm to the second arm, wherein the lateral member includes an offset protrusion section.

15. The bowfishing arrow slide of claim 14, wherein the offset protrusion section on the lateral member is formed from first and second offset arms extending from the lateral member, and an offset arm extending between the first and second offset arms, wherein the offset arm is offset from the lateral member.

16. The bowfishing arrow slide of claim 1, wherein the shock absorbing system comprises a first shock absorbing system coupled to a first end of the body and a second shock absorbing system coupled to a second end of the body.

17. A bowfishing arrow slide, comprising:
a body forming at least one shaft retention section configured to slidably retain an arrow shaft therein such that the bowfishing arrow slide may slide along the arrow shaft generally along a longitudinal axis of the arrow shaft;
at least one bowfishing line attachment section configured such that a bowfishing line is attachable to the bowfishing arrow slide; and
a shock absorbing system on the bowfishing arrow slide, wherein the shock absorbing system is configured to absorb impact forces created when the bowfishing arrow slide strikes a slide stop on an arrow shaft when the arrow is shot;
wherein the body, the at least one bowfishing line attachment section and the shock absorbing system are an integrally formed unit and the shock absorbing system is formed from alternating partial slots positioned non-parallel to a longitudinal axis of the body forming the at least one retention section.

18. A bowfishing arrow slide, comprising:
a body forming at least one shaft retention section configured to slidably retain an arrow shaft therein such that the bowfishing arrow slide may slide along the arrow shaft generally along a longitudinal axis of the arrow shaft;
at least one bowfishing line attachment section configured such that a bowfishing line is attachable to the bowfishing arrow slide;
a shock absorbing system on the bowfishing arrow slide, wherein the shock absorbing system is configured to absorb impact forces created when the bowfishing arrow slide strikes a slide stop on an arrow shaft when the arrow is shot; and
wherein the body forming the at least one shaft retention section and the at least one bowfishing line attachment section are formed from elongated wire forming at least one loop.

19. The bowfishing arrow slide of claim 18, wherein the at least one bowfishing line attachment section is formed from the elongated wire comprising at least a plurality of loops.

20. The bowfishing arrow slide of claim 18, wherein the at least one bowfishing line attachment section is formed from the elongated wire comprising at least three loops.

* * * * *